G. G. EARL.
AUTOMATIC CONTROLLING OR REGULATING APPARATUS.
APPLICATION FILED FEB. 8, 1913.

1,211,830.

Patented Jan. 9, 1917.

Witnesses:

Inventor:
George G. Earl,
by His Attorney

UNITED STATES PATENT OFFICE.

GEORGE GOODELL EARL, OF NEW ORLEANS, LOUISIANA.

AUTOMATIC CONTROLLING OR REGULATING APPARATUS.

1,211,830. Specification of Letters Patent. Patented Jan. 9, 1917.

Continuation of application Serial No. 536,239, filed January 3, 1910. This application filed February 8, 1913. Serial No. 747,105.

*To all whom it may concern:*

Be it known that I, GEORGE G. EARL, a citizen of the United States, residing at New Orleans, in the parish of Orleans and State of Louisiana, have invented certain new and useful Improvements in Automatic Controlling or Regulating Apparatus; and I do hereby declare the following to be a full, clear, and exact description of the invention, such as will enable others skilled in the art to which it appertains to make and use the same.

This invention relates to devices or apparatuses that are employed for automatically controlling or actuating an independent mechanism such, for example, as a recording or indicating device or a valve or set of valves for governing the head or the level of a liquid.

The main object of my invention is to provide an apparatus of the character described that is of simple construction and which will accurately control the device or mechanism which it is desired to operate automatically or provide a record of such operation.

This application is a continuation of the application #536,239, filed Jan. 3, 1910.

Another object is to provide an automatic controlling apparatus which is so constructed that any variation in the flow of a liquid through an orifice or any variation in the level of a liquid on either side of an orifice, will automatically set into operation mechanism which causes the controlled device to move or change its position.

Another object is to provide an apparatus of the character described which is so constructed that any variation in a head of liquid over, or acting upon an orifice or discharging member will cause a head of liquid over or acting upon a separate orifice or over a number of separate orifices or discharging members to automatically vary proportionately or functionally.

Another object is to provide a controlling apparatus which is so constructed that any variation in the level of a liquid will bring about a corresponding variation in the level of the same liquid or a similar liquid at a different point, the level at the second point being either at an equal, lesser, or a greater elevation than that of the level at the first point. And still another object of my invention is to provide a controlling apparatus of simple construction that will cause a valve in a supply pipe to change its position automatically when the level of the liquid in the reservoir or container, into which said supply pipe discharges, varies.

Other objects and desirable features of my invention will be hereinafter pointed out.

One of the fundamental principles of this invention consists in my discovery that many useful purposes in controlling the movement of a substance can be accomplished by an apparatus or device capable of automatically creating and maintaining a head, level or pressure over, on or against a fixed point, which will always be proportional or functional to another head, level or pressure, or to the difference between two or more heads, levels or pressures, one or more of which may be varying.

In the devices hereinafter illustrated, the pressures, or differences of pressures, which have been shown for utilization are, in some cases, the heads on two sides of an orifice. It is obvious, however, that the difference between any two other heads, levels or pressures which also varies functionally with a fluid flow in a conduit, could be used with equal facility with this device.

I have herein illustrated one form of apparatus embodying my invention, but I wish it to be understood that the broad idea herein described could be embodied in various other forms of apparatus than those herein shown without departing from the spirit of my invention.

Figures 1, 2, 3:
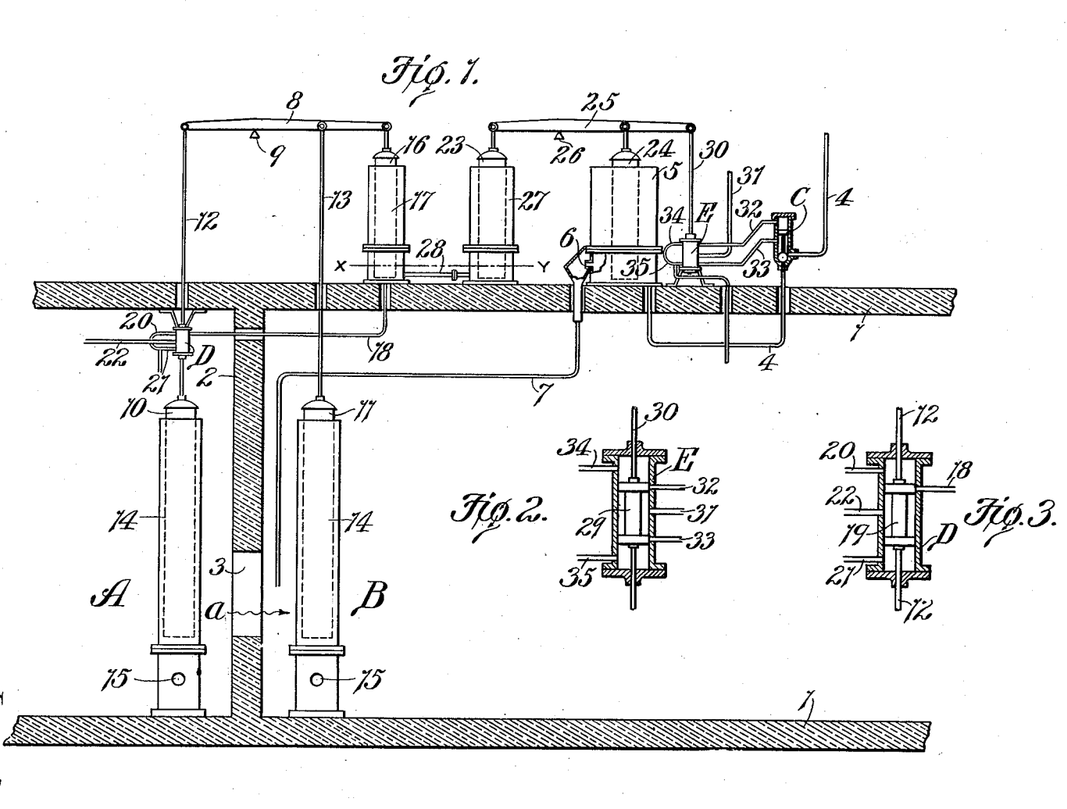
Figure 1 of the drawings is a diagrammatic view of an apparatus embodying my invention, said apparatus being used for automatically controlling the supply of a chemical solution to water which it is desired to treat with said solution.
Fig. 2 is a detail vertical sectional view of the balanced pilot valve that controls the fluid which actuates the hydraulic valve arranged in the chemical solution supply pipe.
Fig. 3 is a detail vertical sectional view of the balanced pilot valve that controls the admission and egress of water to and from the receptacle in which one of the weights is arranged.

Referring to Fig. 1 of the drawings, 1 designates the top and bottom walls of a conduit through which water flows, and 2 designates a vertically disposed partition that separates said conduit into two compartments A and B, said partition being provided with an orifice 3 that permits the water to flow from the compartment A into the compartment B, as indicated by the arrow $a$. The object of this apparatus is to control the introduction of a chemical solution into the water in the compartment B and cause the flow of said chemical solution to vary automatically as the flow of water into said compartment varies. The chemical solution is contained in a suitable tank, not shown, and is conducted from said tank by means of a pipe 4 to a tank 5 having an orifice 6 that permits the chemical solution to escape from said tank through a pipe 7 into the compartment B, a hydraulic valve C being arranged in the pipe 4 for controlling the flow of the chemical solution to the tank 5. While I have herein shown a hydraulic valve C for controlling the supply of chemical solution to the water conduit, it will, of course, be obvious that any other suitable type of valve could be used for this purpose and, therefore, I do not wish it to be understood that my broad idea is limited to the exact construction herein shown.

A beam or lever 8, which oscillates on a fixed or stationary fulcrum 9, sustains two cylindrical-shaped weights 10 and 11 of equal length and diameter, said weights being supported by rods 12 and 13, respectively, that are pivotally connected to the beam 8 at equal distances from the fixed fulcrum of said beam. The weight 10 is arranged in the compartment A on one side of the orifice 3 and the weight 11 is arranged in the compartment B on the opposite side of said orifice, said weights being preferably arranged in such a manner that the lower ends of both weights will be approximately level with the lower edge of the orifice 3 when the beam 8 is in perfect balance. These weights preferably consist of closed cylinders loaded with some suitable heavy material which imparts enough weight to same to cause the cylinders to act as weights even though they are completely submerged by the water in the conduit. In other words, these cylinders 10 and 11 are weighted in excess of their displacement, so that, though they will be partially supported by its liquid, they will not float to the surface even when they are completely submerged. I prefer to arrange said weights inside of tubular-shaped protecting members 14 having openings 15 at their lower ends that permit the water in the conduit to flow into same and thus rise to the same height around the weights as the water on the outside of said protecting members, the function of these protecting members 14 being merely to prevent the flowing water in the conduit from exerting a lateral pressure on the weights or cylinders 10 and 11 or from surging around said weights and thus throwing them out of a true vertical position or causing them to oscillate more rapidly than does the mean level of the water around them.

A weight 16, which preferably consists of a closed cylinder weighted in excess of its displacement, is connected to one end of the beam 8, and said weight is arranged inside of a tank 17 to which water is supplied, as hereinafter described. This weight 16 is approximately one-half the length and area of the weights 10 and 11, but it is suspended from the beam 8 at twice the lever distance from the fulcrum of said beam as the weights 10 and 11. Consequently, a one-pound pull on weight 16 will balance a two-pound pull on weight 10 and will be equal to a two-pound pull on weight 11.

The cylinders or weights 10, 11 and 16 are connected to the beam 8 in such a manner that they will be in balance only when certain conditions are established; namely, when the water on both sides of the orifices 3 is at the same level and the water in the tank 17 is at a certain level; for example, the level indicated by the dot-and-dash lines $x$ and $y$ in Fig. 1. If the level of the water around the cylinder 10 varies, the sustaining force which said water exerts on said cylinder will, of course, change and thus throw the beam 8 out of balance. For example, if the flow of water into the conduit increases, the water in the compartment A will rise to a higher level than the water in the compartment B because the water has to pass through an orifice 3 of less diameter than the conduit, in passing from the compartment A into the compartment B, the partition 2 in the conduit forming practically a dam that holds back or impedes the flow of water. This difference in the level of the water on the two sides of the orifice 3 will throw the beam 8 out of balance, for the weight 11 will exert a greater downward pull on the beam than the weight 10 does whenever the level of the water around the weight 11 is lower than the level of the water around the weight 10. It is immaterial, so far as the successful operation of my apparatus is concerned, whether the normal level of the water is at the lower ends of the weights 10 and 11 or at the middle or top of said weights, for so long as the level on both sides of the orifice 3 is equal, the water will not flow through said orifice and the beam and weights will remain in perfect balance. As soon as the water starts to flow through the orifice, however, the level of the water in the compartment A will rise and thus cause the weight 11 to descend and the weight 10 to move upwardly.

The destruction of the equilibrium of the weights and beam or the movement of said beam in either direction causes a means to be set in motion that will restore the equipoise of said beam and weights, and, in the embodiment of my invention herein shown, said means consists of a hydraulic medium that is admitted to or conducted away from the tank 17 by means of a pipe 18, said hydraulic medium being controlled or set in motion by means of a balanced pilot valve D. It will, of course, be obvious, however, that any other suitable device would be substituted for the balanced pilot valve D, and in other embodiments of my invention wherein a pneumatic or an electrical medium is employed for restoring the equipoise of the system, a suitable device for same, such, for example, as a pneumatic valve or an electric switch or contacts, will be substituted for the valve D herein shown. The piston 19 of the valve D is herein shown as being secured to the rod 12 which forms the connection between the weight 10 and the beam 8 but it will, of course, be obvious that a separate connection between said piston and the beam or one of the weights could be employed without departing from the spirit of my invention.

The casing or cylinder inside of which the piston 19 of the valve D is reciprocatingly mounted, is provided at its upper and lower ends with waste-pipes 20 and 21. The pipe 18 that leads from the lower end of the tank 17 is tapped into the casing of the pilot valve D adjacent the upper end thereof, and a pressure line 22 is tapped into the casing of said valve at approximately the center thereof, as shown in Fig. 3, the piston 19 being so arranged that the pipe 18 is closed when the weights and beam 8 are in balance. The upward movement of the weight 10, caused by the rising of the water around said weight, imparts an upward movement to the piston 19 of the pilot valve D and thus opens the pipe 18 so that the water from the pressure line 22 can flow through said pipe into the tank 17 inside of which the weight 16 is arranged. The water continues to flow into this tank 17 until the level around the weight 16 is as much above the normal level indicated by the dot-and-dash lines $x$ and $y$ as the level of the water about the weight 11 is lower than the level about the weight 10. In other words, the pilot valve D permits enough water to flow into the tank 17 to exert sufficient additional sustaining pressure on the weight 16 to equalize the upward pressure that was exerted on the weight 10 by the water rising around same. The introduction of the water from the pressure line 22 into the tank 17 thus causes the beam 8 to return to its normal balanced position, and as said beam moves back to its normal position, the piston 19 of the pilot valve moves back to its normal position, thereby cutting off the flow of water from the pressure line into the pipe 18.

If the supply of water to the conduit should thereafter be diminished the level of the water in compartment A will drop and thus cause the weight 10 to descend. The downward movement of this weight 10 causes the piston 19 of the pilot valve D to move downwardly but said piston is so constructed that it does not permit the water from the pressure line to flow into the pipe 18 when it moves in this direction, the downward movement of said piston merely opening the pipe 18 so that the water from the tank 17 can drain out through said pipe into the cylinder of the pilot valve and thence escape through the waste-pipe 20 adjacent the upper end of said valve cylinder. The water continues to drain out of the tank 17 until the water level around the weight 16 has dropped or fallen to a point only as much above the normal level indicated by the dot-and-dash lines $x$ and $y$ as the difference between the level around the weight 10 and the level around weight 11. That is to say, if the difference of level around 10 and 11 decreases, the equilibrium of beam 8 will be destroyed and the piston of pilot valve D will be moved downwardly and in such a direction that the water in tank 17 can drain out of same. The draining of the tank 17 diminishes the sustaining force on the weight 16, thereby causing said weight to move downwardly gradually as the level around it falls, and thus causing the beam 8 to resume its balance and close the pilot valve D so as to prevent further draining of tank 17. The level in tank 17 will then stand as much above the dot-and-dash line $x$ and $y$ as the level around 10 is higher than the level around 21. If desired, the mechanism for actuating the gate of the hydraulic valve C that controls the flow of the chemical solution through the pipe 4, could be operated by the beam 8 so as to cause the supply of chemical solution to vary as the quantity of water supplied to the compartment B varies, but in the form described, for reasons to be hereinafter stated, I use a separate set of weights 23 and 24 and a beam 25 for operating the piston of a balanced pilot valve E which controls the hydraulic medium that actuates the hydraulic valve C.

If only a single solution is to be used, the pilot valve E could be substituted for valve D and made to govern the hydraulic valve C governing the flow of chemical solution which could be made to enter tank 17. In this case, the difference in level around 10 and 11 would be balanced by a level of chemical solution around 16 and as this level around 16 would always be equal to the difference in level around 10 and 11 if tank 17 were provided with an orifice having its center on the line $x$—$y$, it is evident that the discharge from this orifice could be made to enter the line 7 and be directly applied to the water passing through orifice 3. The beam 25 is mounted on a fixed fulcrum 26, and the weights 23 and 24 are connected to said beam at equal distances from the fulcrum thereof, said weights preferably consisting of closed cylinders of equal area that are weighted in excess of their displacement, so that they will act as weights even when they are completely submerged. The weight 23 is arranged inside of a tank 27, and the weight 24 is arranged inside of the tank 5 which receives the chemical solution from the supply pipe 4, the tank 27 being in communication with the tank 17 by means of a pipe 28, so that water can enter the tank 27 and assume the same level as the water in the tank 17. The weights 23 and 24 are so arranged that they will be in balance only when the level of the water around weight 23 is the same as the level of the chemical solution around the weight 24, the least change in level around said weights causing the beam 25 to move and thus vary the position of the piston of the pilot valve E. The gate of the hydraulic valve C is so arranged that when the beam 25 is in balance the quantity of chemical solution that leaves the tank 5 through the orifice 6 will be just the same as the quantity of chemical solution that enters said tank through the pipe 4. The balanced pilot valve is of substantially the same construction as the pilot valve D previously described, and the piston 29 of said valve is secured to a rod 30 that is pivotally connected to one end of the beam 25. A pressure line 31 leads to the center of the cylinder or casing of the valve E and pipes 32 and 33 lead from said valve cylinder to the cylinder of the hydraulic valve C, the cylinder of the pilot valve E being provided with waste-pipes 34 and 35 that lead from the upper and lower ends thereof, respectively.

Whenever the level of the water around the weight 23 drops the beam 25 will move in a direction to impart an upward movement to the piston 29 of the balanced valve E and thus permit the water in the pressure line 31 to flow through the pipe 32 into the cylinder of the hydraulic valve C and thus partially close the gate of said valve so as to restrict the flow of the chemical solution through the pipe 4 into the tank 5. The partial closing of the hydraulic valve C of course reduces the supply of chemical solution to the tank 5, and when the level of the solution around the weight 24 has dropped to the level of the water around the weight 23 the beam 25 will return to its balanced position and in doing so, will move the piston of the pilot valve E back to its normal position, the gate of the hydraulic valve remaining in the position to which it has been moved so as to restrict the flow through the pipe 4 sufficiently to keep the level around the weight 24 at the same level as the level around the weight 23. If the level around the weight 23 should rise, as for example, during the time when the water is being admitted from the pressure line 22 into the tank 17 to restore the beam 8 to its normal balanced position, the beam 25 which carries the weights 23 and 24, will be thrown out of balance and thus move the piston of the pilot valve E downwardly so that the water from the pressure line 31 can flow through the pipe 33 into the cylinder of the gate valve C and thus move the gate thereof in a direction to permit a greater quantity of chemical solution to flow into the tank 5 and thus restore the balance of the beam 25, the piston of the pilot valve E of course, cutting off the flow of the water through the pipe 33 when the equilibrium of the beam 25 is again established.

As the level of the water around the weights 16 and 23 must always be the same, and as the level around weight 16 is always equal to the difference of level around the weights 10 and 11, it necessarily follows that the head of liquid over the orifice 6 in the chemical solution tank 5 will always vary proportionately with the head of water over the main orifice 3 in the water conduit. Consequently, the flow of the chemical solution through the orifice 6 will always be proportionate, within certain limits, with the flow of water from the compartment A into the compartment B.

While I have herein shown only one weight 23 in the tank 27 for controlling a single beam 25, it will, of course, be obvious that said tank could be made large enough to receive a number of weights, each of which could be used for operating a beam or lever that governs a device for controlling the flow of liquid through an independent pipe. In this way, any desired number of orifices could be controlled and thus regulate a number of different streams of liquid.

I claim:—

1. In an apparatus of the character described, a beam, weights suspended from said beam, one of said weights being adapted to be submerged or partially submerged by a liquid on one side of an orifice, and the other weight being adapted to be submerged or partially submerged by a liquid on the other side of said orifice, said weights being so proportioned and arranged that the beam is in balance when the liquid around said weights stands at a certain level or certain levels, a chemical feed device, and hydraulically controlled means governed by the flow of fluid through said orifice for causing said device to operate when the level of the liquid around said weights varies and thus destroys the equilibrium of the beam.

2. In an apparatus of the character described, a beam, weights suspended from said beam, one of said weights being adapted to be submerged or partially submerged by a liquid on one side of an orifice, and the other weight being adapted to be submerged or partially submerged by a liquid on the other side of said orifice, said weights being so proportioned and arranged that the beam is in balance when the liquid around said weights stands at a certain level or certain levels, a device, means for causing said device to operate when the level of the liquid around said weights varies and thus destroys the equilibrium of the beam, and means for automatically restoring the equilibrium of said beam.

3. In an apparatus of the character described, a beam, weights suspended from said beam, one of said weights being adapted to be submerged or partially submerged by a liquid on one side of an orifice and the other weight being adapted to be submerged or partially submerged by a liquid on the other side of said orifice, said weights being so proportioned and arranged that the beam is in balance when the liquid around said weights stands at a certain level or certain levels, a device, means for causing said device to operate or become operative when the level of the liquid around said weights varies and thus destroys the equilibrium of the beam, and means for restoring the equilibrium of said beam and also causing said device to become inoperative.

4. In an apparatus of the character described, a balanced member which remains in equilibrium so long as a certain condition exists, a device which it is desired to operate automatically, means for causing said device to become operative when the equilibrium of said member is destroyed, and hydraulic operated means for automatically restoring the equilibrium of said member.

5. In an apparatus of the character described, a balanced member which remains in equilibrium so long as a certain condition exists, a plurality of weights suspended from said member, a device which it is desired to operate automatically, means for causing said device to become operative when the equilibrium of said member is destroyed, and means for automatically restoring the equilibrium of said member.

6. In an apparatus of the character described, a balanced member which remains in equilibrium so long as a certain condition exists, a plurality of weights suspended from said member, a device which it is desired to operate automatically and which is capable of assuming a different position, means for causing said device to become operative when the equilibrium of said member is destroyed, and means for restoring the equilibrium of said member and also causing said device to become inoperative.

7. In an apparatus of the character described, a beam, a pair of weights suspended from said beam and arranged in such a position that they will be submerged or partially submerged in a liquid, a receptacle associated therewith, an independent weight suspended from said beam in said receptacle that is adapted to contain a liquid, said beam being in balance when the liquid around said weights stands at certain levels, a device which it is desired to control, and means for causing said device to become operative when the equilibrium of said beam is destroyed.

8. In an apparatus of the character described, a beam, a pair of weights suspended from said beam and arranged in such a position that they will be submerged or partially submerged in a liquid, a receptacle associated therewith, an independent weight suspended from said beam in said receptacle that is adapted to contain a liquid, said beam being in balance when the liquid around said weights stands at certain levels, a device which it is desired to control, means for causing said device to become operative when the equilibrium of said beam is destroyed, and means for changing the level of the liquid in said receptacle to restore the equipoise of the beam.

9. In a hydraulic system of the character described, a beam provided with weights suspended in a fluid which have such a relation in leverage from the fulcrum of said beam that they will be in balance only when a certain condition exists, an actuating means that is adapted to be set in motion when the equilibrium of said beam is destroyed, said means automatically acting to restore the equipoise of the beam, a device, and means whereby said device moves when said beam moves.

10. In an apparatus of the character described, a beam, a pair of weights suspended from said beam and adapted to be submerged or partially submerged in a liquid, a receptacle associated therewith, an independent weight suspended from said beam and arranged inside of said receptacle, and a device adapted to be actuated by the movement of said beam for permitting a liquid to enter said receptacle or escape therefrom so as to restore the equipoise of said beam after it has been thrown out of balance.

11. In an apparatus of the character described, a beam provided with weights which are adapted to be submerged or partially submerged in a liquid, means for restoring the equipoise of said beam after it has been thrown out of balance, and a device controlled by the movement of said beam for governing said means.

12. In an apparatus of the character described, a balanced member, a receptacle associated therewith, a weight suspended from one end of said balanced member and arranged inside of said receptacle that is adapted to contain a liquid, and means for admitting liquid into said receptacle to restore the equipoise of said member when it moves in one direction and also permitting liquid to escape from said receptacle to restore the equipoise of the member when it moves in the opposite direction.

13. In an apparatus of the character described, a balanced member, a weight suspended from one end of said balanced member and arranged inside of a receptacle that is adapted to contain a liquid, means for admitting liquid into said receptacle to restore the equipoise of said member when it moves in one direction and also permitting liquid to escape from said receptacle to restore the equipoise of the member when it moves in the opposite direction, and a governing device that operates automatically when said balanced member moves.

14. In an apparatus of the character described, a beam, weights suspended from said beam on opposite sides of the fulcrum thereof, one of said weights communicating with a liquid on one side of an orifice and another weight communicating with a liquid on the other side of said orifice, the equilibrium of said beam being destroyed when the level of the liquid around said weights varies from a certain point, an independent mechanism, and a device hydraulically operated by the movement of said beam for controlling said independent mechanism.

15. In an apparatus as described, a vibratory balanced member, a pivot on which the same is balanced, said member remaining in equilibrium so long as a certain condition exists, a device which it is desired to operate automatically, means for causing said device to become operative when the equilibrium of said member is destroyed and hydraulic means through which said member exercises control over said first named means.

16. An apparatus of the character described, comprising two weights arranged on opposite sides of an orifice through which a liquid flows, a beam to which said weights are connected, said weights being so arranged that the equilibrium of said beam is destroyed when the level of the liquid on opposite sides of said orifice varies, a receptacle adapted to contain a liquid and having an orifice through which said liquid can escape, and means for causing the level of the liquid in said receptacle to vary automatically as the level of the liquid on opposite sides of the orifice first referred to varies.

17. In an apparatus of the character described, a beam provided with a pair of weights that are arranged on opposite sides of an orifice through which a liquid flows, a tank adapted to contain a liquid and having an orifice through which said liquid can escape, a valve for regulating the flow of liquid into said tank, mechanism for controlling the position of said valve, a medium for restoring the equipoise of said beam and also operating said valve-controlling mechanism, a device for controlling said medium, and means for causing said device to move when said beam moves.

18. In an apparatus of the character described, a beam, a tank, weights suspended from said beam and arranged on opposite sides of an orifice through which a liquid flows, an independent weight suspended from said beam and arranged inside of said tank that is adapted to contain a liquid, automatic means for governing the flow of a liquid into and out of said tank to restore the equipoise of the beam after said beam has become unbalanced by variations in the level of the liquid on the opposite sides of the said orifice, a pair of receptacles adapted to contain a liquid, one of said receptacles having an orifice through which the liquid therein can escape, and the other receptacle communicating with said tank, a second beam provided with weights that are arranged inside of said receptacles, a valve for controlling the flow of liquid into the receptacle which is provided with the orifice, and means operated by said second beam for governing said valve.

19. In an hydraulic system of the character described, a balanced member which remains in a state of equilibrium so long as a certain condition exists, hydraulic controlled means for restoring the equipoise of said member, and a device controlled by said balanced member for causing said means to become operative when the equilibrium of said member is destroyed.

20. In an apparatus of the character described, a normally balanced member, which remains in equilibrium so long as a certain condition exists, a device which it is desired to operate automatically, means for causing said device to become operative when said member is moved from normal position and means to restore said member to normal position without operating said device.

21. In combination, a fluid receptacle, means including a source of pressure for creating a fluid pressure in said receptacle, a second fluid receptacle, second means including a source of pressure for creating a second pressure in said second receptacle, mechanism including a vibratory member having a range of motion for automatically causing changes in the pressure in one of said receptacles functionally to the changes of pressure in the other of said receptacles said mechanism exposing to said pressure a constant effective area throughout the full range of motion of the vibratory member, a third receptacle having an opening therein through which a substance may pass and means controlling the passage of the substance through said opening, said last named means being governed by said mechanism.

22. In combination, a plurality of receptacles, a plurality of sources of pressure for creating fluid pressure in said receptacles, mechanism including vibratory means having constant, definite, effective areas exposed to the pressures from said sources for the full range of its vibrations for automatically causing changes in the pressure in one of said receptacles functionally to resultants of the changes of pressure in the other of said receptacles, a third receptacle having an opening therein through which a substance may pass and means controlling the passage of the substance through said opening, said last named means being governed by said mechanism.

23. In an apparatus of the character described, a plurality of movable members, connecting means connecting said members together, one of said members being adapted to be submerged or partially submerged by a liquid on one side of an orifice, and the other member being adapted to be submerged or partially submerged by a liquid on the other side of said orifice, said members being so proportioned and arranged that the connecting means is in balance when the liquid around said members stands at a certain level or certain levels, a device and hydraulically controlled means for causing said device to operate when the level of the liquid around said members varies and thus destroys the equilibrium of said connecting means.

24. In a fluid regulating system, the combination of a source of pressure, a pressure cell, connections between said source and cell transmitting fluid under pressure from said source to said cell, a second pressure cell, a second source of adequate fluid pressure, connections for conveying fluid under pressure from said second named source to said second cell, movable apparatus exposed to the pressures in said cells and operated thereby, and mechanism including a valve controlled by said apparatus for maintaining the pressure in the second cell equal to the pressure in the first.

25. In a fluid regulating system, the combination of a source of fluid pressure, a pressure cell, means to transmit fluid pressure from said source to said cell, a second source of adequate fluid pressure, an outlet for fluid flow, means to connect said source and said outlet, a second pressure cell connected to said second source, movable apparatus operated upon by the pressures in said cells, and a valve in the means connecting the second source and the outlet controlled by said movable apparatus for maintaining the pressure in the second cell equal to the pressure in the first.

26. In a fluid regulating system, two fluid pressure chambers, a movable member affected by the pressure in said chambers, a varying static fluid pressure in one of said chambers, a source of fluid pressure higher than the said varying static fluid pressure and an outlet of lower fluid pressure than said varying static fluid pressure, a fluid passage-way from said source to said outlet connected with the other of said pressure chambers between said source and said outlet and means including a valve operated by said movable member governing the flow of fluid through said passage-way to maintain the static fluid pressure in the last named pressure chamber equal to the varying static fluid pressure in the first named pressure chamber.

27. In an apparatus of the class described, the combination of a source of fluid pressures, a compartment, means to transmit fluid pressure from said source to said compartment, a second compartment, means to transmit a second and different fluid pressure from said source to said second compartment, a buoyant member in each compartment responding to changes in pressure therein, a pivoted lever connected on one side of its pivot to one of said buoyant members and on the other side to the other member, a third source of pressure, a duct for conveying fluid from said third source of pressure to one of said compartments and a valve in said duct controlled by said lever.

28. In an apparatus of the class described, the combination of a source of fluid pressures, a pressure cell or compartment, means to transmit fluid pressure from said source to said cell, a second pressure cell or compartment, means to transmit fluid pressure from said source to the second cell or compartment, mechanism in said compartments responding to changes in pressure therein, a second source of pressure, a duct conveying fluid from said second source to one of said compartments and a valve governing the flow through said duct controlled by said mechanism.

29. In combination, a wall having an orifice therein, a fluid receptacle on each side of said orifice, means for creating fluid pressures in said receptacles, and mechanism including a vibratory member for automatically causing changes in the pressure in one of said receptacles functionally to the resultant of changes of pressure in the other of said receptacles.

30. In combination, a plurality of fluid receptacles, a plurality of sources of pressure for creating fluid pressure in said receptacles, mechanism including a vibratory member, means about which said member vibrates, said member being freely movable about said means through its full range of vibration, a plurality of said receptacles being upon one side of said means, said mechanism adapted to automatically cause changes in the pressure in one of said receptacles functionally to the resultant of the changes of pressure in the other of said receptacles.

31. In combination, a plurality of liquid receptacles, a plurality of sources of pressure for creating liquid pressures in said receptacles, normally balanced vibratory means controlled by said pressure, and means governed by said first named means controlling said fluid pressure to restore said first named means to normal when disturbed therefrom.

32. In combination, a plurality of fluid receptacles, a plurality of sources of pressure for creating fluid pressures in said receptacles, normally balanced vibratory means controlled by said pressures, and means governed by said first named means, controlling said fluid pressure to automatically restore said first named means to normal when disturbed therefrom.

33. As a means for creating a proportional flow, the combination of a plurality of fluid receptacles, a vibratile member adapted to be operated by the pressure in such receptacles, sources of fluid pressure, the difference between which is proportional to the main flow, another and higher source of pressure, a third receptacle, means to connect said other source of pressure to said third receptacle, a fourth fluid receptacle, means therein for discharging to the low pressure side of the first named source of pressure, and means controlled by the vibratory member governing the discharge.

34. In combination, a liquid receptacle, means including a source of pressure for creating a liquid pressure in said receptacle, a second liquid receptacle, second means including a source of pressure for creating a second pressure in said second receptacle, and mechanism including a vibratory member movable through a certain range for automatically causing changes in pressure in one of said receptacles functionally to the changes of pressure in the other of said receptacles, said member being freely movable and having a definite area throughout its range of motion.

35. In a hydraulic system, a fluid pressure cell, a source of fluid pressure creating a varying static pressure in said cell, a second fluid pressure cell, a source of fluid pressure higher than the aforesaid varying static pressure, connection from said last named source to said last named cell, a freely movable vibratile member affected oppositely by the static pressure in said cells, an outlet for fluid flow connected with said last named cell and means including a valve operated by the vibratile member regulating the flow from the second named source of pressure to the second named cell to maintain the static fluid pressure therein equal to the varying static fluid pressure in the first named cell, both of said pressures being measured from a common datum.

36. In combination, a liquid main, a vibratile member, means responsive to changes in pressure in said main for vibrating said member, to maintain it in balance, a closed conduit, devices governed by said member controlling said closed conduit, apparatus by which said member governs said means, and a source of liquid pressure causing a liquid flow in said conduit to said main, said devices being moved functionally to the movement of said member, whereby the flow in the conduit is a function of the flow in the main.

37. In a fluid regulating system, a plurality of fluid pressure cells, means to cause the static fluid pressure in one of said cells to vary, a source of fluid pressure and an outlet for fluid flow of adequate high and low pressure range, a fluid passage-way from said source to said outlet, connection between said source and said outlet with one of said fluid pressure cells, a movable member acted upon by the static fluid pressure in all of said cells in a definite amount and direction in each said cell for each definite condition of static pressure in said cell and in equilibrium only when a predetermined, functional relation exists between the first named varying static pressures and the pressures in the cells which are connected with the said fluid passage-way, and means including a valve operated by the movable member when its equilibrium is destroyed, governing the flow of fluid from said source to said outlet to regulate the pressure in the last named cells and restore the equilibrium of the movable member.

38. In a fluid regulating system, apparatus creating varying fluid pressures, mechanism movable through a finite range of motion, means to transmit said fluid pressures to said movable mechanism, said mechanism exposing to said pressures definite, unchanging areas through its range of motion, second apparatus for creating another source of pressure and means controlled by said mechanism for maintaining the last named pressure functional to the first named pressures.

39. In a device of the class described, the combination of movable means, apparatus to transmit a varying fluid pressure to one side of said means, second apparatus to convey a second fluid pressure directly to the other side of said means and mechanism including a valve controlled by said means for maintaining the pressure on its two sides equal during the variations in said pressure.

40. In combination, a stationary liquid receptacle, means including a source of pressure for creating a liquid pressure in said receptacle, a second stationary liquid receptacle, second means including a source of pressure for creating a second pressure in said receptacle and mechanism including a vibratory member freely movable through a definite range for automatically causing changes in the pressure in one of said receptacles functionally to the changes of pressure in the other of said receptacles.

41. In combination, a plurality of liquid receptacles, a plurality of sources of pressure for creating liquid pressures in said receptacles and mechanism including a constant area vibratory member freely movable through a definite range for automatically causing changes in the pressure in one of said receptacles functionally to the resultant of the changes of pressure in the other of said receptacles.

42. In combination, two liquid receptacles, a source of liquid pressures for creating liquid pressures in said receptacles, means having a constant, definite, effective area acted upon by said pressures and in balance when the desired relations exist between said pressures and means operated by said means acted upon by one of said pressures to restore the balance of said means whenever any change in the other of said pressures has destroyed said balance.

43. In a fluid regulating system, two fluid pressure cells, a movable member affected by the static pressure in said cells, a varying static fluid pressure in one of said cells, a source of fluid pressure and an outlet for fluid flow of adequate high and low range, a fluid passage-way from said source to said outlet, connected between said source and said outlet with the other of said pressure cells, and means including a valve operated by said movable member governing the flow of fluid through said passage-way to maintain the static fluid pressure in the last named pressure cell in any predetermined, functional relation with the first named varying static fluid pressure.

44. As a means for creating a proportional flow, the combination of a plurality of fluid receptacles, a vibratory member adapted to be operated by the pressure in said receptacles, sources of fluid pressure, the difference between which is functional to the main flow, another and higher source of pressure, a third receptacle, means to connect said other source of pressure to said third receptacle, a fourth fluid receptacle, discharging means therefor, and means controlled by the vibratory member governing the discharge.

45. In a device of the class described, the combination of a fluid main adapted to conduct fluid therethrough, a duct, means to cause fluid to flow through said duct, a device controlling the flow of fluid through said duct, means controlling said device governed by the flow of fluid in the main, said means being disturbed from normal when the flow of fluid in the main changes to operate said device and means for automatically restoring said means to normal without operating said device.

46. In an apparatus of the class described, the combination of a fluid main, a fluid duct, apparatus controlling the flow of fluid in the duct, means normally in equilibrium controlling said apparatus, said means being disturbed from equilibrium when the pressure of the fluid in the main changes to operate said apparatus and mechanism for restoring said means to normal without operating said apparatus.

47. In an apparatus of the class described, the combination of a pair of sources of fluid pressure, two compartments, means to transmit the pressure from one of said sources to one of said compartments, means to transmit pressure from the other source to the other compartment, a buoyant member in each compartment responding to changes in pressure therein, a pivoted lever connected on one side of its pivot to one of said members and on the other side to the other member, a third source of pressure, a duct leading from said source and a valve in said duct controlled by said lever.

48. In a fluid regulating system, a source of varying static fluid pressure, two static fluid pressure cells, means to connect said source of pressure with one of said cells, apparatus to maintain the pressures in said cells equal to each other, including a movable member, means to cause said member to be affected by the pressures in said cells, an adequate source of fluid pressure, an outlet for fluid flow, a passage-way leading from said last named source to said outlet, a connection from said passage-way to the other of said pressure cells and a valve in said passage-way operated by said movable member.

49. In a fluid regulating system, the combination of a plurality of static fluid pressure cells, means to cause changes in pressure in one of said cells, a vibratile member, a plurality of weights, each adapted to be affected in weight by varying liquid levels occasioned by the static fluid pressure in said cells, means connecting said weights to said vibratile member, each weight reacting through said connecting means and vibratile member against some of the other weights, another source of fluid pressure and an outlet for fluid flow of adequate high and low pressure range, a fluid passage-way connecting said outlet and last named source, connections from said passage-way to one other of said cells, and means including a valve in said passage-way operated by said vibratile member to maintain said member in equilibrium.

50. In a fluid regulating system, the combination of two static fluid pressure cells, means to cause changes in pressure in one of said cells, a vibratile member, two weights, each adapted to be affected in weight by varying liquid levels occasioned by the static fluid pressures in said cells, means connecting said weights to said vibratile member, each weight reacting through said means against said vibratile member, means to cause said vibratile member to be in equilibrium at any required initial relation of the static fluid pressures in said two pressure cells, a source of fluid pressure and an outlet for fluid flow of adequate high and low pressure range, a fluid passage-way connecting said outlet and last named source, connection from said passage-way to the other of said cells and means including a valve in said passage-way operated by said vibratile member to maintain said member in equilibrum.

In witnesss whereof, I affix my signature in the presence of two witnesses.

GEORGE GOODELL EARL.

Witnesses:
   E. H. BLOCK,
   JOHN C. BARTLEY.